Sept. 15, 1931.     H. BRACHTL     1,822,879
ADJUSTABLE SERVICE ENTRANCE FITTING
Filed July 18, 1928     2 Sheets-Sheet 1
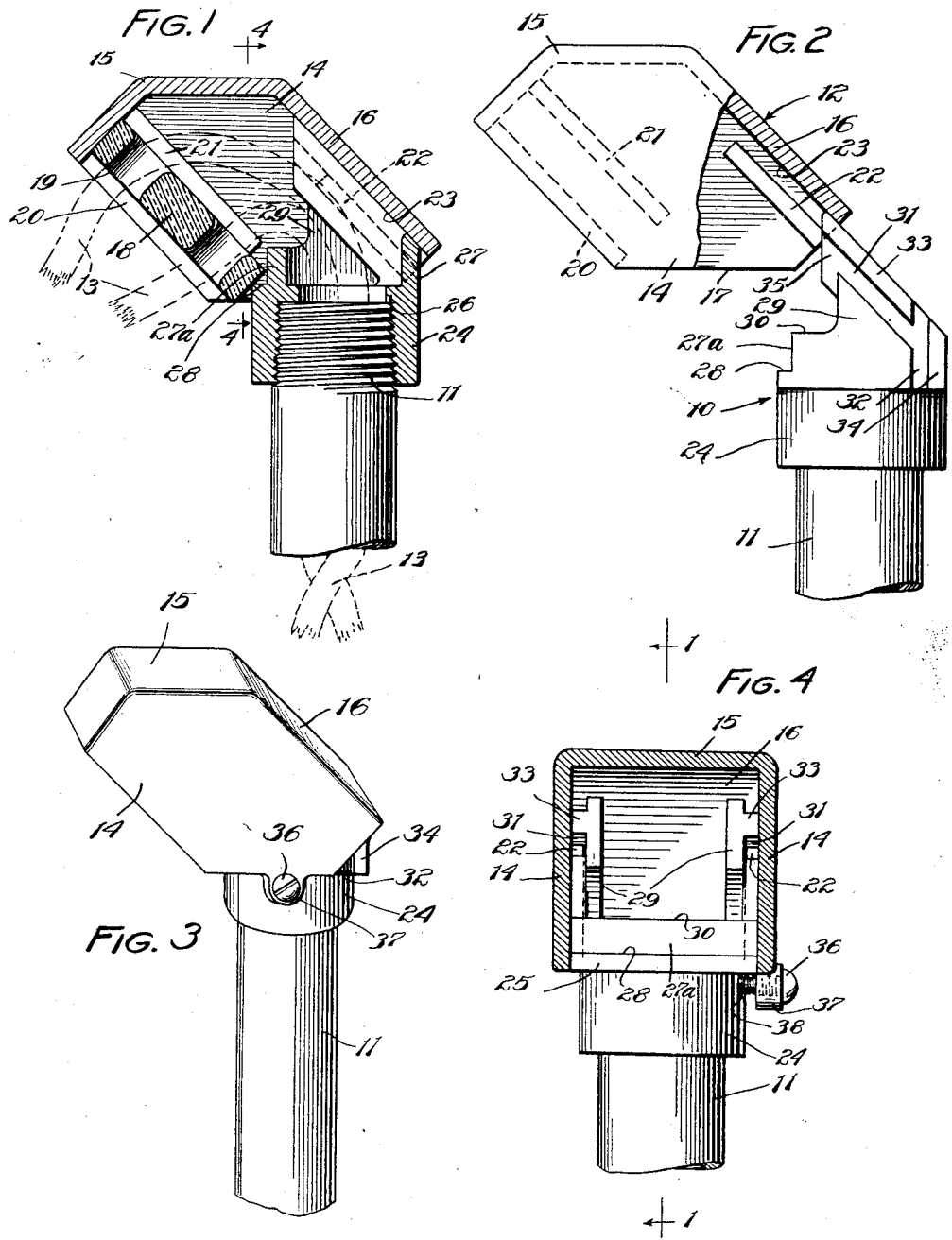

Sept. 15, 1931.　　　　H. BRACHTL　　　　1,822,879
ADJUSTABLE SERVICE ENTRANCE FITTING
Filed July 18, 1928　　2 Sheets-Sheet 2
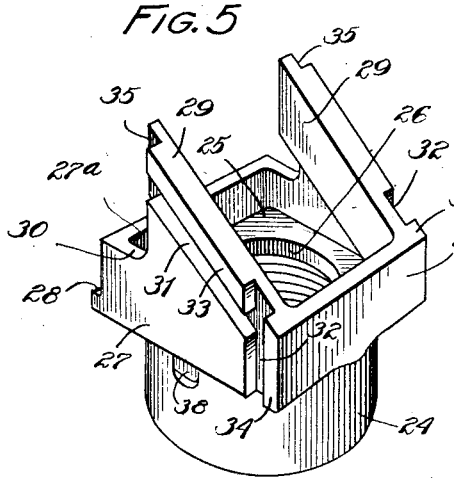
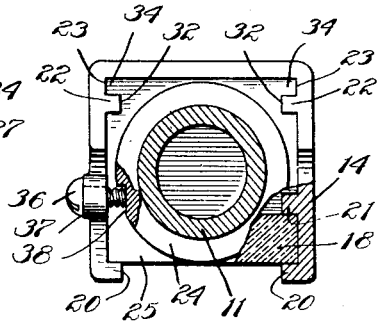
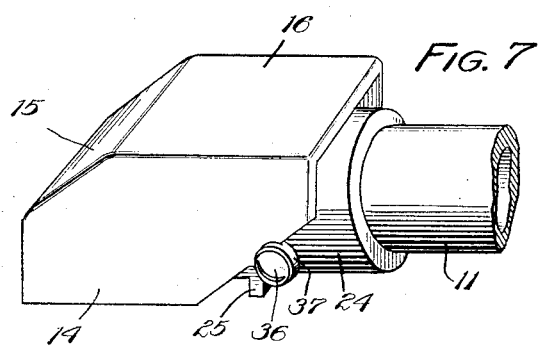
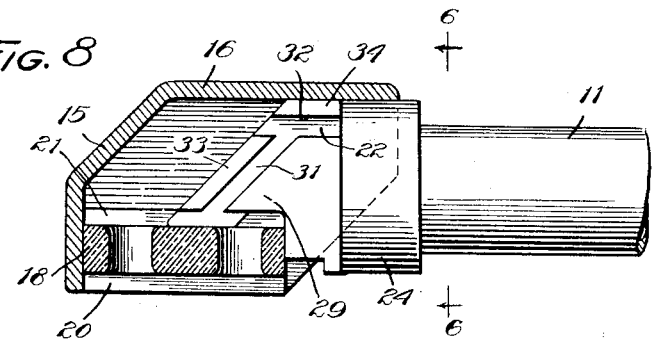

Patented Sept. 15, 1931

1,822,879

UNITED STATES PATENT OFFICE

HENRY BRACHTL, OF CHICAGO, ILLINOIS, ASSIGNOR, BY MESNE ASSIGNMENTS, TO APPLETON ELECTRIC COMPANY, OF CHICAGO, ILLINOIS, A CORPORATION OF ILLINOIS

ADJUSTABLE SERVICE ENTRANCE FITTING

Application filed July 18, 1928. Serial No. 293,717

The invention has particular reference to adjustable service-entrance fittings of the type in which adjustment may be made to accommodate the fitting to a vertical or a horizontal service conduit.

As is well known, electric service wires generally enter a building or structure from the main service lines through a pipe or conduit, the outer end of which is customarily located at an appropriate position on the outer wall of the building. In certain instances, according to the wiring plan of the building, the end of the conduit will lie in a horizontal plane while in other cases the conduit will extend vertically along the wall. In either event it is necessary to provide an entrance fitting for the end of the conduit which renders the conduit weatherproof and which also facilitates the entrance of the lead wires into the conduit.

An object of the invention is to provide a new and improved service entrance fitting of this character which is capable of simple adjustment to permit the fitting to be used in connection with either vertical or horizontal conduits.

A further object of the invention is to provide a device of this nature which is characterized by requiring only a simple angular adjustment of position of the interfitting sections comprising the device to adapt the device for use with either a vertical or a horizontal conduit.

Another object of the invention is to provide a device of this kind which is sturdy and inexpensive in construction, which provides ample protection from the weather, which may be quickly mounted and adjusted on the conduit, and which facilitates the wiring operation.

Other objects and advantages will become apparent from the following description and in the accompanying drawings, in which:

Figure 1 is a central section taken substantially upon line 1—1 of Fig. 4 showing the fitting in position upon a vertically disposed conduit.

Fig. 2 is a side elevation of the fitting upon a vertical conduit, the parts being separated to show the manner of assembly.

Fig. 3 is a perspective view of the fitting mounted upon a vertical conduit.

Fig. 4 is a section taken upon line 4—4 of Fig. 1 showing the interior of the fitting when in position upon a vertical conduit.

Fig. 5 is a perspective view showing the hub portion of the fitting.

Fig. 6 is a rear view of the fitting attached to a horizontal conduit, the view being taken substantially upon the line 6—6 of Fig. 8 looking in the direction of the arrows.

Fig. 7 is a perspective view of the fitting mounted upon a horizontal conduit.

Fig. 8 is a side elevation of the fitting mounted upon a horizontal conduit, portions thereof being broken away to show the interior of the fitting.

While the invention is susceptible of various modifications and alternative constructions, I have shown in the drawings and will herein describe in detail the preferred embodiment, but it is to be understood that I do not thereby intend to limit the invention to the specific form disclosed but intend to cover all modifications and alternative constructions falling within the spirit and scope of the invention as expressed in the appended claims.

In attaining the objects of the invention the service entrance fitting comprises a simple construction in which a part is provided for engagement with the end of the conduit, either in horizontal or vertical position, which part is arranged to receive a second part forming a closed, weather-proof housing therewith in either of the two positions of adjustment. Preferably the engagement between the two parts is such that only a slight angular movement of one part relative to the other, when the parts are in their disengaged position, is necessary to change the fitting from one adapted to be used with a horizontal conduit to one which may be used with a vertical conduit. In the present embodiment such engagement is effected by the provision of two sets of grooves and ribs formed upon one of the parts, which sets are angularly disposed relative to one another and are adapted to engage a single set of complementary ribs and grooves upon the other part.

More particularly described, the fitting comprises a hub member generally indicated at 10, arranged to be permanently mounted upon the end of the conduit 11, which hub member is constructed to receive the housing or cover portion 12 in either of two positions. The cover portion 12 may be of any suitable form which provides the main portion of the enclosure through which service wires 13 may pass. In the present instance the cover is in the form of a generally box-shaped casing having side walls 14, one end wall 15 and a top 16, providing thereby a cover having an open bottom and an open end face. As may be seen in Figs. 2, 7 and 8, the two corners of the cover between the two open faces are cut away as at 17 to provide similar edges on the sides of the cover which provide an open face disposed at an angle to the two open faces on the cover. The open bottom face is arranged to be closed by a suitable insulating block 18 having apertures 19 therethrough permitting the entrance of the lead wires 13 into the fitting.

Preferably means is provided for mounting the insulating block in the cover to close the bottom face in such a manner as to permit the ready removal of the block therefrom. To this end the side edges of the cover are turned inwardly of the open bottom face a short distance to provide flanges 20, Figs. 2 and 6. Interiorly of the cover and extending in spaced parallel relation to the flanges 20 on the edges of the cover are a pair of narrow ribs 21 suitably secured to the sides 14 of the cover. Thus a pair of oppositely disposed channels are provided adjacent the open bottom face of the cover which are adapted to receive the insulating block slidably therein.

The means on the cover which forms part of the interengaging means between the cover and the hub comprises a pair of ribs 22 suitably secured to the sides of the cover and positioned in parallel relation to the top wall 16 of the cover. Preferably the ribs 22 extend inwardly of the cover from the open end face thereof and are spaced from the top of the cover a short distance to provide a narrow groove 23 between each of the ribs and the top.

As has been previously mentioned the hub 10 of the fitting is adapted to be securely mounted upon the end of the conduit. To this end the hub is provided with a tubular nipple portion 24 internally screw-threaded to receive the screw threaded end of the conduit 11. Means is also provided on the hub for presenting the arrangement of grooves and ribs to engage the ribs 22 and grooves 23 in the cover.

In the preferred embodiment illustrated herein this means comprises a plate 25 (Fig. 5) fixed at one end of the nipple portion of the hub transversely of the axis thereof. The plate is centrally apertured to register with the passageway through the nipple and preferably extends a short distance into the passageway to provide an annular shoulder 26 (Fig. 1) for positioning and limiting the extent to which the conduit 11 may be inserted into the hub. The plate 25 is of substantially the same size as the open end of the cover as defined by the top 16, the side walls 14 and the insulated block 18 and when the parts are in assembled relation serves as a closure for this face of the cover.

The plate has formed integral therewith an upstanding wall 27 (Figs. 1 and 5) which extends axially of the hub from the periphery of three sides of the plate and is inset a short distance from the fourth side to provide a shoulder 28, the purpose of which will be hereinafter described. The walls on the two sides of the plate which are adjacent the inset wall designated 27$^a$ are formed to provide a pair of diametrically opposed axially extending arms 29. As may be seen in Figs. 1, 2, 5 and 8, one side of the arms 29 is spaced inwardly from the inset wall 27$^a$ to provide a second shoulder 30 formed by the top of the wall 27$^a$. The opposite sides of the arms slope toward the plate 25 and the angle of slope is preferably the complement of the angle at which the corners 17 of the sides 14 of the cover are cut away. Two sets of grooves 31 and 32 are provided in the outer faces of the arms, one of which, herein the set 31, extends substantially parallel to the sloping edge of the arm and defines ribs 33 flush with the sloping edges of the arms.

The ribs 33 on the arms of the hub are adapted slidably to engage the grooves 23 on the cover with the ribs 22 on the cover engaging the grooves 31 on the hub to secure the cover and the hub together in interlocking relation. The size and disposition of the parts is such that in this position the inner free corner of the insulating block 18 is engaged by the shoulder 28 on the hub to provide a snug closure for this part of the fitting. This engagement between the hub and the cover comprises the angular adjustment which is employed when the fitting is used in connection with a vertical conduit and it will be apparent (reference being had to Figs. 1 and 3) that the angular relation between the cover and the arms on the hub provides that the openings into the interior of the fitting through the insulated block face downwardly.

The other set of grooves 32 in the arms extend substantially parallel to the axis of the hub and are formed in substantially the same manner as the angular set of grooves 31 to provide ribs 34 along the edge of the wall opposite the inset wall 27$^a$. This set of ribs 34 and grooves 32 are arranged to engage the ribs 22 and grooves 23 on the cover in the same manner as in the previous instance and this engagement constitutes the adjustment employed when the fitting is used in connection with a horizontal conduit.

In this arrangement it will be seen (Fig. 8) that the shoulder 30 formed by the top of the inset wall 27ª is arranged to abut the free edge of the insulated block 18 with the side of the arms 29 bearing against the surface of the block to add to the rigidity of the assembly. Preferably the edges of the arms are cut away as at 35 to provide recesses therein for receiving the ribs 21 on the cover for holding the insulated block in place. In this position of angular adjustment it will be seen that the fitting is substantially a continuation of the conduit with the apertures through the insulated block facing downwardly and with the plate on the hub received bodily and snugly within the open end of the cover.

It will be evident, therefore, that since the two sets of grooves in the arms of the hub member are angularly disposed with respect to each other and engage the same set of ribs, that the cover may be adjusted relative to the hub by a simple angular movement of the cover relative to the hub.

A simple means may be provided for holding the cover and the hub in assembled relation in either position of adjustment and such a means is herein shown as comprising a screw 36 having a screw threaded engagement with an ear 37 formed on the cover in such position that the end of the screw is arranged to bear against a seat 38 which may be appropriately formed on the nipple.

The operation of the device is exceedingly simple it being only necessary to determine, by reference to the conduit, in which of the two positions the fitting is to be used, then screwing the hub upon the end of the conduit, and inserting the ribs 22 on the cover into the proper grooves 31 or 32 on the hub when the parts may be firmly fixed together by tightening the screw 36. Since the insulated block 18 is readily detachable from the cover it will be seen that the cover portion need not be attached to the hub until after the wiring has been completed.

From the foregoing it will be apparent that a service entrance fitting has been provided which is simple and inexpensive in construction and which is capable of ready adjustment to adapt the fitting for use with either a horizontally or a vertically disposed conduit.

I claim as my invention:

1. A service entrance fitting comprising, in combination, a cover having an open face, a pair of oppositely disposed ribs extending inwardly of said cover, a hub having a passageway therethrough and having a pair of grooves thereon arranged to receive said ribs on said cover to provide an engagement between said hub and said cover, said hub having a second pair of grooves thereon positioned in substantially the same plane and at an angle to the first mentioned pair of grooves, said second pair of grooves being also arranged to engage said ribs on said cover to provide a second engagement between said hub and said cover.

2. A service entrance fitting comprising, in combination, a closure having two open faces, an insulating block mounted in one of said open faces, a hub member arranged to close the other of said open faces, and means providing an interengagement between said closure and said member, said means comprising a plurality of oppositely disposed grooves and ribs on said closure and a plurality of complementary oppositely disposed ribs and grooves on said hub member, part of said ribs and grooves being arranged at an angle to the remaining ribs and grooves to provide two positions of engagement between said closure and said hub member.

3. A service entrance fitting comprising a cover member forming an enclosure having an open face, a hub member arranged to close said open face, engaging means on said cover, and two complementary engaging means on said hub member disposed at an angle to each other and arranged optionally to be engaged by the engaging means on the cover.

4. A service entrance fitting comprising a cover having an inlet side and an open face, a hub member arranged to close said open face, hub-engaging means on said cover, and two complementary engaging means on the hub member disposed at an angle to each other and arranged optionally to be engaged by the hub-engaging means on the cover, to secure said cover and hub members together in either of two angular positions of adjustment.

5. A service entrance fitting comprising a cover having an open face, a hub member engaged to close said open face, and cooperating ribs and grooves on the cover and hub member arranged optionally to hold the cover on said hub member with the plane of its said face lying in either of two planes disposed at an angle to each other.

6. A service entrance fitting comprising a cover and a hub member, said hub member having two sets of grooves arranged at an angle to each other, and ribs on said cover adapted to be engaged with the grooves of either set, thereby to position the cover on the hub member in either of two complementary positions of adjustment.

In testimony whereof, I have hereunto affixed my signature.

HENRY BRACHTL.